United States Patent Office 3,463,267
Patented Aug. 26, 1969

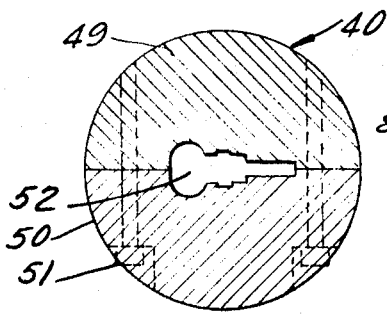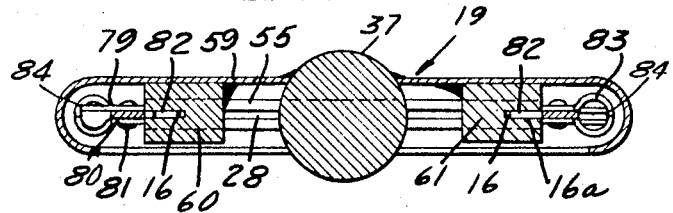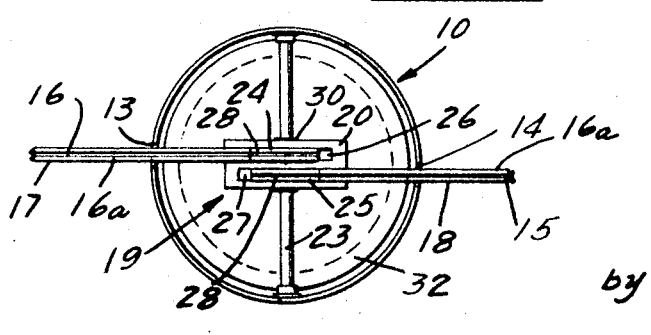

3,463,267
OIL IMPREGNATING METHOD AND APPARATUS FOR CHAIN
James L. Dooley, Santa Monica, and Austin Gudmundsen, Inglewood, Calif., assignors to McCulloch Corporation, Los Angeles, Calif., a corporation of Wisconsin
Filed Oct. 23, 1965, Ser. No. 503,864
Int. Cl. F16n 1/00; F01m 1/00, 3/00
U.S. Cl. 184—1                                                                 6 Claims

ABSTRACT OF THE DISCLOSURE

Impregnating the wear surfaces of an articulate saw chain with a lubricating oil, in which the chain is longitudinally movably guided through restricted channels interconnecting an upper chamber open to atmosphere with a lower chamber partially filled with oil, a pump being provided to circulate the oil from the lower chamber into the upper chamber and by this means cause the lower chamber above the oil therein to be evacuated, the oil in the upper chamber flowing through the restricted channels into the lower chamber to form a seal between the chambers and wash, lubricate and remove debris from the chain.

---

This invention relates to a means and method for impregnating lubricating oil on all of the wear surfaces of a chain, and more particularly, a chain comprised of side and center links alternately connected by pintles.

In a saw chain, for example, alternate side and center links are connected by pintles in which the links pivot. The openings in the links surrounding the pintles and the pintles have wear surfaces which must be lubricated. During the manufacture of the chain, air enters between the wear surfaces and is not removed by conventional oiling means, such as dipping the chain in an oil bath. This air prevents complete lubrication of the wear surfaces. According to the invention, the air is removed by a vacuum just prior to the time the lubricating oil is applied to the wear surfaces.

It is an object of the invention to provide an improved means and method for applying lubricating oil to all of the wear surfaces of a chain.

It is another object of the invention to provide a means and method to impregnate oil on all of the wear surfaces in a continuous length of chain in a continuous oil impregnating operation.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes:

FIG. 1 is a partial cross-sectional view of an oil impregnating device according to the invention;

FIG. 2 is a cross-sectional view, taken as indicated by the line 2—2 in FIG. 1;

FIG. 3 is a cross-sectional view, taken as indicated along the line 3—3 in FIG. 1; and FIG. 4 is a top plan view of the device shown in FIG. 1, having the top and chain removed.

Referring again to the drawings, in FIG. 1, there is shown a generally cylindrical container 10 having a removable top 11 with a handle 15. At the upper end 12 of the container are two substantially opposite, vertical slots 13 and 14. As shown in FIGS. 1, 3 and 4, fitted in the slots are two horizontal portions 17 and 18 of a chain track and guide, generally designated as 19. Each of the portions 17 and 18 have an upwardly open groove 16 adapted to receive chain tangs and flat surfaces 16a on each side of the groove to support side links of the chain.

Secured to the track portions 17 and 18 is a horizontal supporting bar 20 and extending through the bar 20 is a shaft 23 upon which chain guide wheels 24 and 25, as shown in FIGS. 1 and 4, are mounted for rotation. Each of the wheels have a peripheral groove 28 in alignment with the grooves 16 for receiving chain tangs; the wheels also may have sprocket teeth, formed in the groove 28, to be driven by the tangs. The wheel are fitted to rotate within slots 26 and 27, extending vertically through the bar 20 and the shaft 23 is secured in place by spring clamps 30. It is extended so as to be slidably engageable within the container 10 so as to position and support the guide 19 therein and so as to be available as handles to lift the guide from the container.

A generally cylindrical bar 31 is secured at its upper end to the lower surface of the bar 20 and has a pair of grooves in the upper end in which the wheels 24 and 25 extend.

The lower end of the bar 31 is supported vertically on a disc plate 32 which has a central opening 35 directly below the bar 31. Sealingly secured in the opening 35 is a small diameter connecting portion 36, threadedly engaged in a tapped bore in the lower end of the bar 31 and being integral with a cylindrical support member 37. The support member 37 is rotated so as to tighten the bar 31 on the disc 32 and so as to similarly tighten a shoulder 38, on the upper end of the bar 37, in abutment with the lower face of the disc 32.

Positioned on opposite sides of the bar 31 are generally cylindrical chain guide members 40 and 41, each having a small diameter portion 42 and 43, respectively, extending through and being sealingly secured in openings 46 and 47 in the disc plate 32. Each of the guides 40 and 41 are held firmly in place by means of snap rings 48 in abutment with the lower side of the disc 32.

The guide members 40 and 41 are formed of two half cylinders 49 and 50, as shown in FIG. 2, secured together by cap screws 51. The interior of each of the halves is milled throughout its entire length, including the small diameter portions 42 and 43, so that when the halves are put together, an opening 52 extends through their entire length. The opening 52 conforms to the chain configuration and is just large enough so as to permit easy travel of the chain therethrough.

At the lower end of the support bar 37 is a chain guide wheel 55 having a peripheral groove 28 therein. The wheel is mounted for rotation on a shaft 58, supported in the bar 37. As may be best seen in FIGS. 1 and 3, a track guide support frame 59 is secured to the bar 37. Secured to the frame 59 on opposite sides of the bar 37 are straight, vertical track and guide portions 60 and 61, having longitudinally directed, outwardly facing grooves 16 therein to receive the chain tangs and having flat surface 16a to support the side links. The grooves 16 in the track 60 and 61 are in alignment with the groove 28 in the wheel 55 and are also in alignment with the openings 52 in the guide members 40 and 41 so that the chain, and more particularly, the tangs will move directly into the grooves.

Since the bar member 37 is tightened against the bottom of the disc 32, the lengths of the small diameter portions 42 and 43 and the lengths and positions of the frame 59 and the track members 60 and 61 must be such so that when the bar 37 is tightened, the track members 60 and 61 will abut the bottom surfaces of the members 42 and 43, respectively, and will be in proper alignment so that the chain will move freely from one to the other.

The chain track and guide 19, 59 and the disc 32 are lowered as one integral member into the container 10 and the disc is lowered to be supported by an annular flange 64 secured to the container wall. The disc is sealingly secured to the flange by means of cap screws 65. The disc 32 separates the container 10 into two chambers, a lower chamber 66 and an upper chamber 67. For operation, the upper chamber 67 must have lubricating oil therein at a level above the guide members 40 and 41 and the lower chamber must have adequate oil to immerse a substantial portion of the chain. The oil is poured into the container 10 from the top and may be drained out for cleaning purposes through a drain plug 70 at the bottom.

At the left of the lower chamber is an oil outlet or a pump suction inlet 71. The inlet 71 is connected to an oil filter 72 which in turn is connected to a gear pump 73, driven by a motor 74. The pump 73 takes a suction on the chamber 66, creating a vacuum in the part thereof that is not filled with oil and pumps oil from the chamber into the upper chamber through a pipe 76 and through a discharge 77.

To reduce the viscosity of the lubricating oil in the chamber 66, a coil heater 85 is provided by which the oil is heated to an operating range of about 150° to 180° F.

The chain, generally indicated as 78, is comprised of side links 79 and center links 80 which are alternately and pivotally connected by means of pintles 81. The center links have inwardly directed tangs 82 which ride in the various track and guide grooves, the side links riding on the flat track surfaces and on the peripheral surfaces of the wheels. The chain has router type cutters 83, alternately and allochirally arranged on selected side links. These cutters extend outwardly from the side links and return toward the center of the chain in a toe 84. It may be seen in comparing FIGS. 2 and 3 that the chain configuration is such so as to conform to the openings 52 in the guide members 40 and 41, the openings 52 being as small as possible but being large enough to permit easy movement of the chain therethrough. Thus, when oil is flowing through the openings 52 from the chamber 67 into the chamber 66, along with the moving chain, the oil and the chain form a seal for the chamber 66 so that the pump suction creates a vacuum above the oil level in the latter chamber.

To start the operation, fifteen gallons of turbine oil are poured into the container 10 before the chain guide assembly is put into the latter. The chain is threaded onto the guide assembly, first on the member 18 and over the wheel 24, down through the guide 40, on the track 60 and onto the lower wheel 55. Then it is moved upwardly onto the track 61 into the guide 41, over the wheel 25 onto the track portion 17. The chain is positioned so as to move backwardly so that the cutters are not damaged. The chain guide assembly 19 is then put into the container and the cap screws 65 are tightened so that the disc forms a seal between the upper and lower chambers. The chain is fed from the left of FIG. 1.

After the pump is started, the heater 85 is energized and in a short time the lower chamber will have a mercury vacuum approaching 29 inches. After sufficient oil is pumped from the lower chamber into the upper chamber to cover the entrance to the openings 52 in the guide members 40 and 41, the chain may then be moved through the container as a continuous length or piece at rates of from between 90 to 210 feet per minute. The pump, during chain movement, delivers oil into the upper chamber at a rate substantially equal to that at which oil can leak down through the openings 52 in guide members 40 and 41 with the result that the oil leaking past the chains through the openings 52 along with the chain, seals the vacuum in the lower chamber, and in addition washes most of the debris from the assembled chain.

The vacuum functions to remove the air from all of the wear surfaces on the chain, the air more particularly being between the pintles and the openings in the links through which pintles extend and which provide the wear surfaces. Thus, as the chain moves downwardly from the vacuum above the oil in the lower chamber and into the oil, the oil is permitted to contact all of the surfaces where it is needed so as to provide continuous lubrication. If the air is not removed from the wear surfaces around the pintles, as by vacuum according to the invention, the oil is not permitted to be applied to all the surfaces because of the encased air.

The oil circulated through the filter passes through a one hundred mesh screen. This keeps the oil clean for a substanial period after which it must be drained through the plug 70. Such draining is necessary after approximately two weeks of use.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. We do not wish to be restricted to the specific form shown or uses mentioned except as defined in the accompanying claims, wherein various portions have been separated for clarity of reading and not for emphasis.

We claim:

1. A method of oil impregnating all wear surfaces of an articulate chain having side links and center links alternately connected by pintles, comprising:

(a) pumping oil from an oil bath in a first chamber to an oil bath in a second chamber above said first chamber;
   (b) creating a partial vacuum in said first chamber above said oil bath and below said second chamber;
   (c) moving a length of chain through said oil bath in said second chamber;
   (d) moving said chain through a narrow passage from said second chamber into said first chamber;
   (e) flowing oil from said second chamber through said narrow passage and into said first chamber such that a seal around said chain and between said chambers is formed;
   (f) moving said chain through said vacuum;
   (g) moving said chain into said oil bath in said first chamber;
   (h) moving said chain from said first chamber to said second chamber through a second narrow passage between said chambers; and
   (i) flowing oil from said second chamber to said first chamber through said second narrow passage such that a seal around said chain and between said chambers is formed.

2. A method of oil impregnating all wear surfaces of an articulate chain having side links and center links alternately connected by pintles, comprising:

(a) pumping oil from an oil bath in a first chamber to an oil bath in a second chamber above said first chamber;
   (b) creating a partial vacuum in said first chamber and below said second chamber;
   (c) continuously moving a continuous length of chain through said oil bath in said second chamber;
   (d) continuously moving said chain through a narrow passage from said second chamber into said first chamber;
   (e) continuously flowing oil from said oil bath in said second chamber through said narrow passage to form a seal around said chain and between said chambers;
   (f) continuously moving said chain through said vacuum;
   (g) continuously moving said chain into said oil bath in said first chamber;
   (h) continuously moving said chain from said first chamber to said second chamber through a second narrow passage between said chambers; and (i) continuously flowing oil from said second chamber to said first chamber through said second narrow passage to form a seal around said chain and between said chambers.

3. A device for impregnating oil on all wear surfaces of an articulate chain having side links and center links alternately connected by pintles, said device comprising:
   (a) a sealable first closed chamber adapted to be partially filled with oil;
   (b) a second chamber vertically above said first chamber, the bottom wall of the second chamber being the top of the first chamber;
   (c) means connected to both chambers to pump oil from said first chamber to said second chamber and to create a vacuum in said first chamber when it is sealed; and
   (d) means including a chain track to provide a chain path and to guide a chain from without said second chamber into said second chamber, into said first chamber to expose the chain to the vacuum and oil therein, and then into said second chamber and outwardly thereof,
   (e) said last means including two narrow passages extending between said chambers, said passages conforming to the chain and being just large enough to permit the chain to pass therethrough, one of said passages being to permit the chain to travel from the second chamber to the first chamber and the other being to permit the chain to travel from the first chamber to the second chamber,
   (f) said passages for permitting the flow of said oil from said second to said first chamber,
   (g) said passages providing a seal between said chambers when containing said chain and when said oil is flowing therethrough.

4. A device for impregnating oil on all wear surfaces of an articulate chain having side links and center links alternately connected by pintles, said device comprising:
   (a) a first sealable closed chamber partially filled with oil,
   (b) a second chamber vertically above said first chamber, the bottom wall of the second chamber being the top of the first chamber;
   (c) means connected to both chambers to pump oil from said first chamber to said second chamber and to create a vacuum in said first chamber above said oil when it is sealed; and
   (d) means including a chain track to provide a chain path and to guide a chain from without said second chamber into said second chamber, into said first chamber to expose the chain to the vacuum and oil therein, and then into said second chamber and outwardly thereof;
   (e) said last means including two narrow passages extending between said chambers, said passages conforming to the chain and being just large enough to permit the chain to pass therethrough, one of said passages being to permit the chain to travel from the second chamber to the first chamber and the other being to permit the chain to travel from the first chamber to the second chamber,
   (f) said second chamber being filled with oil above said narrow passages to fill the latter around said chain and permitting the flow of oil around said chain and from said second chamber to said first chamber,
   (g) said oil and chain-filled passages providing a seal between said chambers.

5. A device for impregnating oil on all wear surfaces of an articulate chain having side links and center links alternately connected by pintles, said device comprising:
   (a) an upright container;
   (b) separator means vertically dividing said container into an upper chamber open to atmosphere, and a lower closed chamber adapted to be partially filled with oil;
   (c) means connected between said chambers for pumping oil from said lower chamber to said upper chamber and to create a vacuum in said lower chamber above the oil therein;
   (d) means including a track for guiding longitudinal movement of a chain to be impregnated in a path entering said upper chamber, from the upper chamber downwardly into said lower chamber to expose the chain to the vacuum and oil therein, from the lower chamber upwardly into said upper chamber, and thence leaving said upper chamber;
   (e) said last means including two narrow passages extending between said chambers and having upper ends normally submerged in the oil in said upper chamber and lower ends communicating with the space above the oil in the lower chamber, said passages conforming generally to the chain periphery and being just large enough to permit the chain to pass therethrough, one of said passages permitting the chain to travel from the upper chamber to the lower chamber and the other permitting the chain to travel from the lower chamber to the upper chamber, and
   (f) said passages further permitting flow of oil from said upper chamber to said lower chamber, whereby to provide a seal between said chambers.

6. A device according to claim 5, including rotatably mounted chain guide wheels adjacent the upper ends of said passages having upper portions extending above the oil in the upper chamber, and a rotatable chain guide wheel adjacent the lower ends of said passages having a lower portion immersed in the oil in said lower chamber.

References Cited

UNITED STATES PATENTS

| 1,595,237 | 8/1926 | Minton | 134—122 X |
| 2,083,731 | 6/1937 | Miller | 118—50 |
| 2,405,221 | 8/1946 | Mann | 118—50 X |

LAVERNE D. GEIGER, Primary Examiner

E. J. EARLS, Assistant Examiner

U.S. Cl. X.R.

118—50; 184—15